United States Patent
Cook et al.

(10) Patent No.: US 6,825,136 B2
(45) Date of Patent: Nov. 30, 2004

(54) FILTERING SCREENS FOR VIBRATORY SEPARATION EQUIPMENT

(75) Inventors: Gordon James Cook, deceased, late of Newtonhill (GB); by Robert Ian Thompson, legal representative, Bothwell (GB)

(73) Assignee: United Wire Limited, Eidinburg (GB)

( * ) Notice: Subject to any disclaimer, the term of this patent is extended or adjusted under 35 U.S.C. 154(b) by 145 days.

(21) Appl. No.: 10/220,699

(22) PCT Filed: Mar. 6, 2001

(86) PCT No.: PCT/GB01/01009

§ 371 (c)(1),
(2), (4) Date: Nov. 25, 2002

(87) PCT Pub. No.: WO01/68218

PCT Pub. Date: Sep. 20, 2001

(65) Prior Publication Data

US 2003/0148680 A1 Aug. 7, 2003

(30) Foreign Application Priority Data

Mar. 11, 2000 (GB) .............................................. 0005832

(51) Int. Cl.[7] .............................. B07B 1/04; B07B 1/28; B07B 1/40; B01D 29/52; D03D 15/02

(52) U.S. Cl. ................................ 442/6; 55/485; 55/486; 55/488; 55/489; 209/309; 209/315; 209/397; 210/488; 210/489; 210/492

(58) Field of Search ............................... 442/6; 55/485, 55/486, 488, 489; 209/309, 315, 397; 210/488, 489, 492

(56) References Cited

U.S. PATENT DOCUMENTS

| 4,575,421 A | 3/1986 | Derrick et al. |
| 5,221,008 A | 6/1993 | Derrick |
| 5,690,826 A | 11/1997 | Cravello |

FOREIGN PATENT DOCUMENTS

| DE | 2221068 | 10/1973 |
| GB | 2175222 | 11/1986 |

*Primary Examiner*—Terrel Morris
*Assistant Examiner*—A B Sperty
(74) *Attorney, Agent, or Firm*—Barnes & Thornburg LLP

(57) ABSTRACT

A filtering screen comprises a fine woven wirecloth filtering mesh (4) disposed above a coarse woven wirecloth support mesh (2). An intermediate woven wirecloth mesh (3) is disposed between the fine woven mesh (4) and the coarse woven mesh (2), the intermediate mesh (3) extending over a proportion of the area of the screen at or towards the rear thereof, said proportion being in the range of 20% to 40% of the area of the screen, and preferably substantially one third of the area of the screen.

6 Claims, 2 Drawing Sheets

FILTERING SCREENS FOR VIBRATORY SEPARATION EQUIPMENT

FIELD OF THE INVENTION

This invention relates to filtering screens for vibratory separation equipment such as shale shakers utilised in the oil/gas drilling industry for separating solids from the liquid phase of muds employed whilst drilling.

BACKGROUND OF THE INVENTION

It is standard in the separation of solids from the liquid phase to have vibratory screens, tensioned or otherwise, adhered to a supporting sub-structure designed to fit into the cradle of a vibratory machine.

A variety of designs exist such as pretensioned wirecloths mounted and adhered to a plastic composite apertured support frame or wirecloths mounted and adhered to a perforated metal or plastic support plate or wirecloths mounted over a metal apertured support plate in itself supported by a punched metal or fabricated sub-frame.

Generally, the cloths mounted on the support media consist of two or three layers of woven wirecloth. One form consists of a filtering mesh (mesh being defined as apertures per lineal inch) over a coarse support mesh, both meshes differentially tensioned, the main functions of the support mesh being both to support the finer filtering mesh and induce a slight slapping action to prevent plugging or blinding of the filtering mesh. This is known as a two layer screen. Other constructions consist of a fine filtering mesh over an intermediate mesh, similar or slightly coarser than the filtering mesh, mounted over a much coarser support mesh. This is known as a three layer screen. Each has its own benefits and disadvantages.

The two layer screen utilising two totally disparate meshes, for example 200 mesh over a 30 mesh, provides a much superior separation efficiency with a well-defined cut point (see FIG. 1 of the accompanying drawings). On the other hand, the three layer screen because of the wirecloth combinations creates a wide range of aperture sizes across the screen which results in a much poorer separation potential and a wider range of cut points (see FIG. 2 of the accompanying drawings).

However the three layer screen has the benefit that the interaction of the three meshes can, in certain geological formations, assist in deblinding and, because of the greater mass of the cloth, give a longer life particularly at the rear of the screen which is subjected to the main initial flow of the returned mud. The user therefore has to decide whether or not to sacrifice efficiency. This invention aims to combine the benefits of both the two layer screen and the three layer screen.

SUMMARY OF THE INVENTION

According to the invention there is provided a filtering screen comprising a fine woven wirecloth filtering mesh disposed above a coarse woven wirecloth support mesh, wherein an intermediate woven wirecloth mesh is disposed between the fine woven mesh and the coarse woven mesh, the intermediate mesh extending over a proportion of the area of the screen at or towards the rear thereof, said proportion being in the range of 20% to 40% of the area of the screen.

Preferably, said proportion is substantially one third.

In a preferred embodiment, the three woven wirecloth meshes are differentially tensioned and retained in a frame, and the intermediate woven wirecloth mesh has a mesh count smaller than the fine mesh and larger than the coarse mesh.

The addition of the intermediate mesh in the rear area gives additional structural support in the area which is subjected to the greatest load, abrasion and fatigue stress whilst as the fluid flows along the screen the remaining two thirds or thereabouts will give the desired separation efficiency.

BRIEF DESCRIPTION OF THE DRAWINGS

Two preferred embodiments of the invention will now be described, by way of example, with reference to the accompanying drawings, in which:

Referring to FIG. 3, the first embodiment of filtering screen comprises a support frame 1 above which are positioned, in turn, a coarse woven wirecloth support mesh 2, an intermediate mesh 3 and a fine woven wirecloth mesh 4. The intermediate mesh 3 extends over substantially the rear third of the area of the screen. The tension applied to the intermediate mesh 3 is less than the tension applied to the mesh 2 but more than the tension applied to the mesh 4. The intermediate mesh 3 is made out of woven stainless steel cloth. Alternatively, the mesh 3 can be woven from a synthetic plastics material or made from a perforated plastics material. The meshes 2 and 4 are made of woven stainless steel.

In FIG. 4, where parts corresponding to FIG. 3 bear the same reference numerals, the three meshes are mounted and tensioned in a perforated plate 5.

Figure 1:
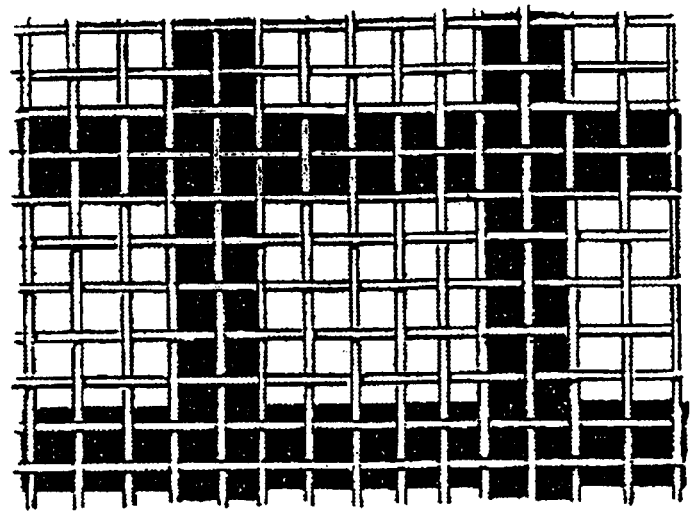
FIGS. 1 and 2 show known two layer and three layer screens.
Figure 2:
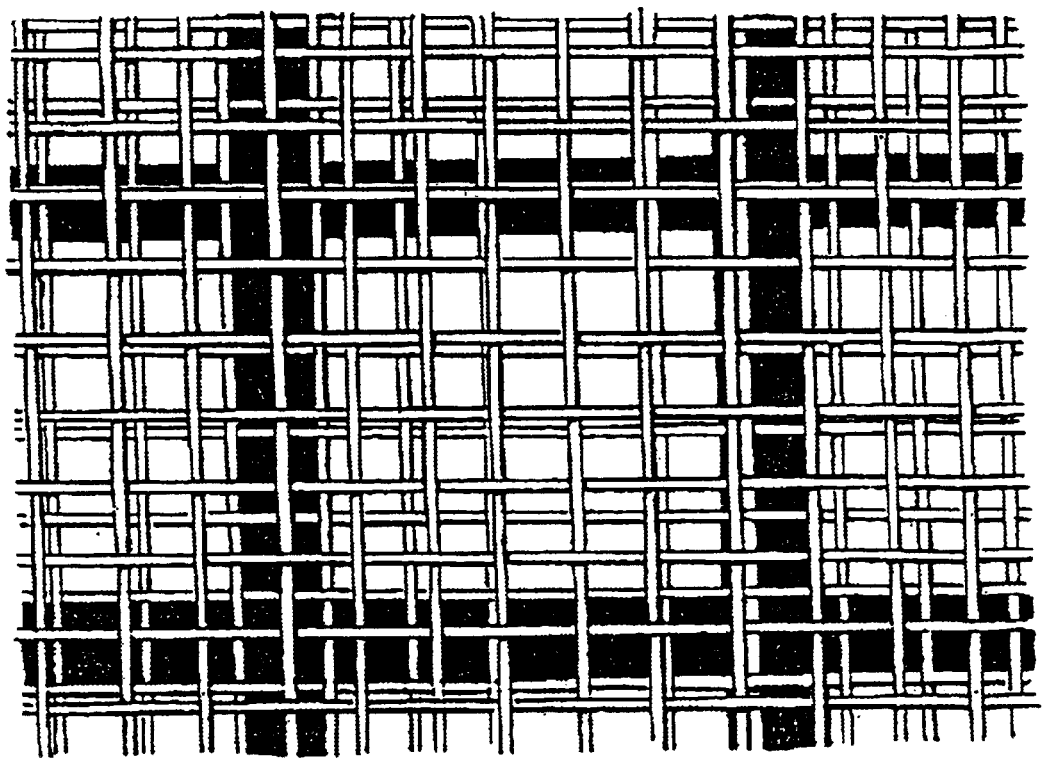
Figure 3:
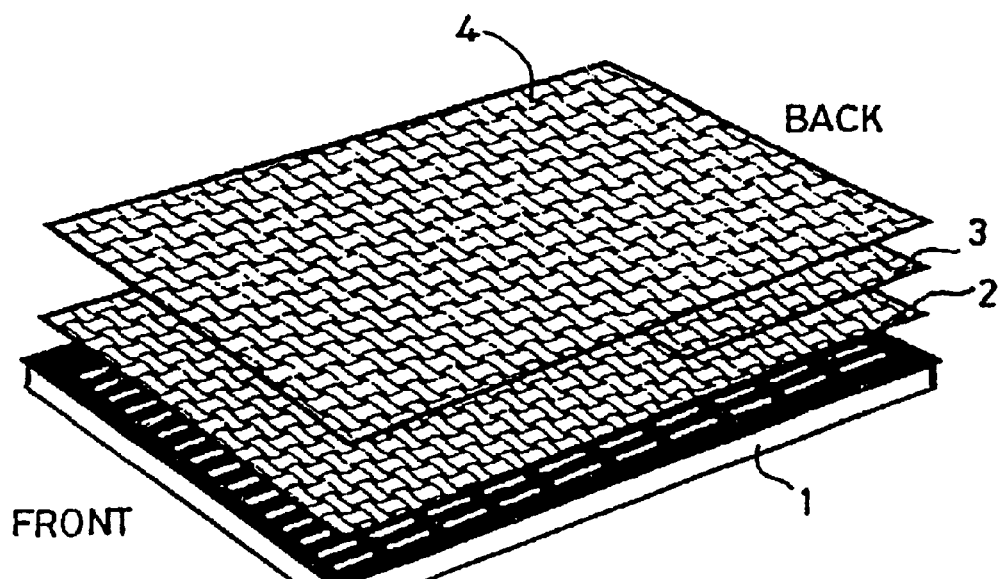
FIG. 3 is a perspective view, with the individual filtering meshes separated, of a first embodiment of filtering screen according to the invention.
Figure 4:
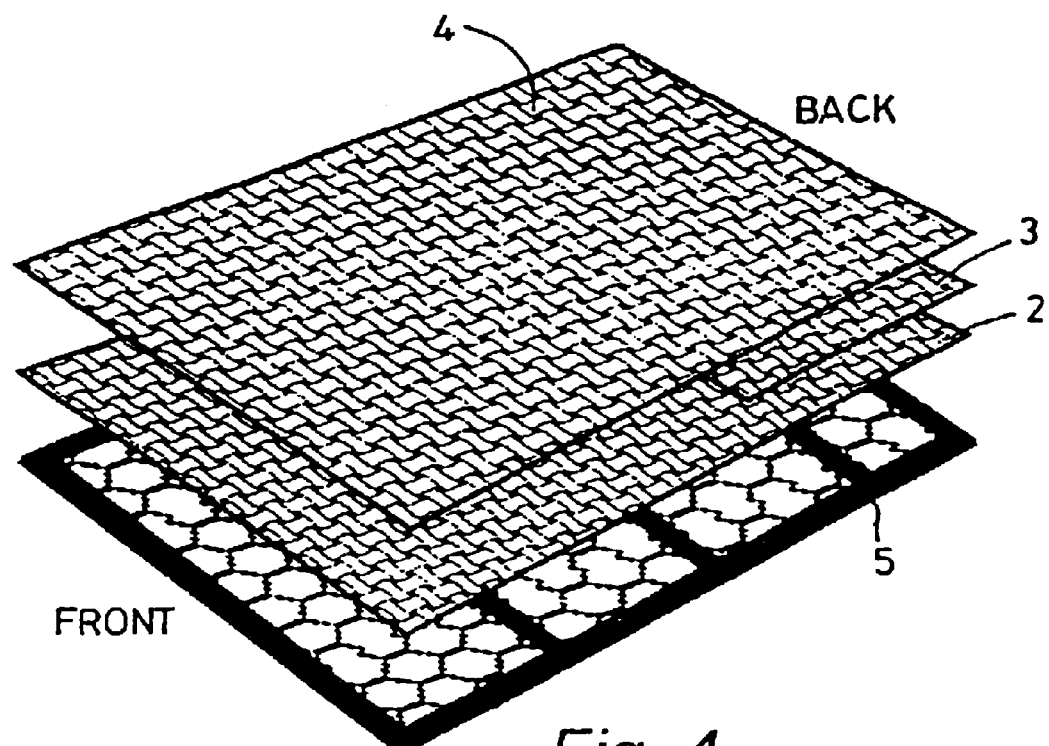
FIG. 4 is a perspective view, with the individual filtering means separated, of a second embodiment of filtering screen according to the invention.

In use, the filtering screen of FIG. 3 or 4 is mounted in vibratory separation equipment and the mud is fed to the back of the screen, which can be at a slightly lower level than the front of the screen. The vibratory screen separates the solids from the liquid phase of the mud as the latter is transported towards the front of the screen.

What is claimed is:

1. A filtering screen comprising a fine woven wirecloth filtering mesh disposed above a coarse woven wirecloth support mesh, wherein an intermediate mesh, made of woven wirecloth, a woven synthetic plastics material or a perforated synthetic plastics material, is disposed between the fine woven mesh and the coarse woven mesh, the intermediate mesh extending over a proportion of the area of the screen at or towards the rear thereof, said proportion being in the range of 20% to 40% of the area of the screen.

2. A filtering screen according to claim 1, wherein said proportion is substantially one third.

3. A filtering screen according to claim 1, wherein the three woven wirecloth meshes are differentially tensioned and retained in a frame.

4. A filtering screen according to claim 1, wherein the intermediate woven wirecloth mesh has a mesh count smaller than the fine mesh and larger than the coarse mesh.

5. A filtering screen according to claim 1, wherein the intermediate mesh is woven from a synthetic plastics material.

6. A filtering screen according to claim 1, wherein the intermediate mesh is made from a perforated synthetic plastics material.

* * * * *

UNITED STATES PATENT AND TRADEMARK OFFICE
CERTIFICATE OF CORRECTION

PATENT NO. : 6,825,136 B2
DATED : November 30, 2004
INVENTOR(S) : Gordon James Cook et al.

It is certified that error appears in the above-identified patent and that said Letters Patent is hereby corrected as shown below:

Title page,
Item [22], PCT FILING DATE, should read -- March 8, 2001 --.

Signed and Sealed this

Fifth Day of April, 2005

JON W. DUDAS
*Director of the United States Patent and Trademark Office*